UNITED STATES PATENT OFFICE.

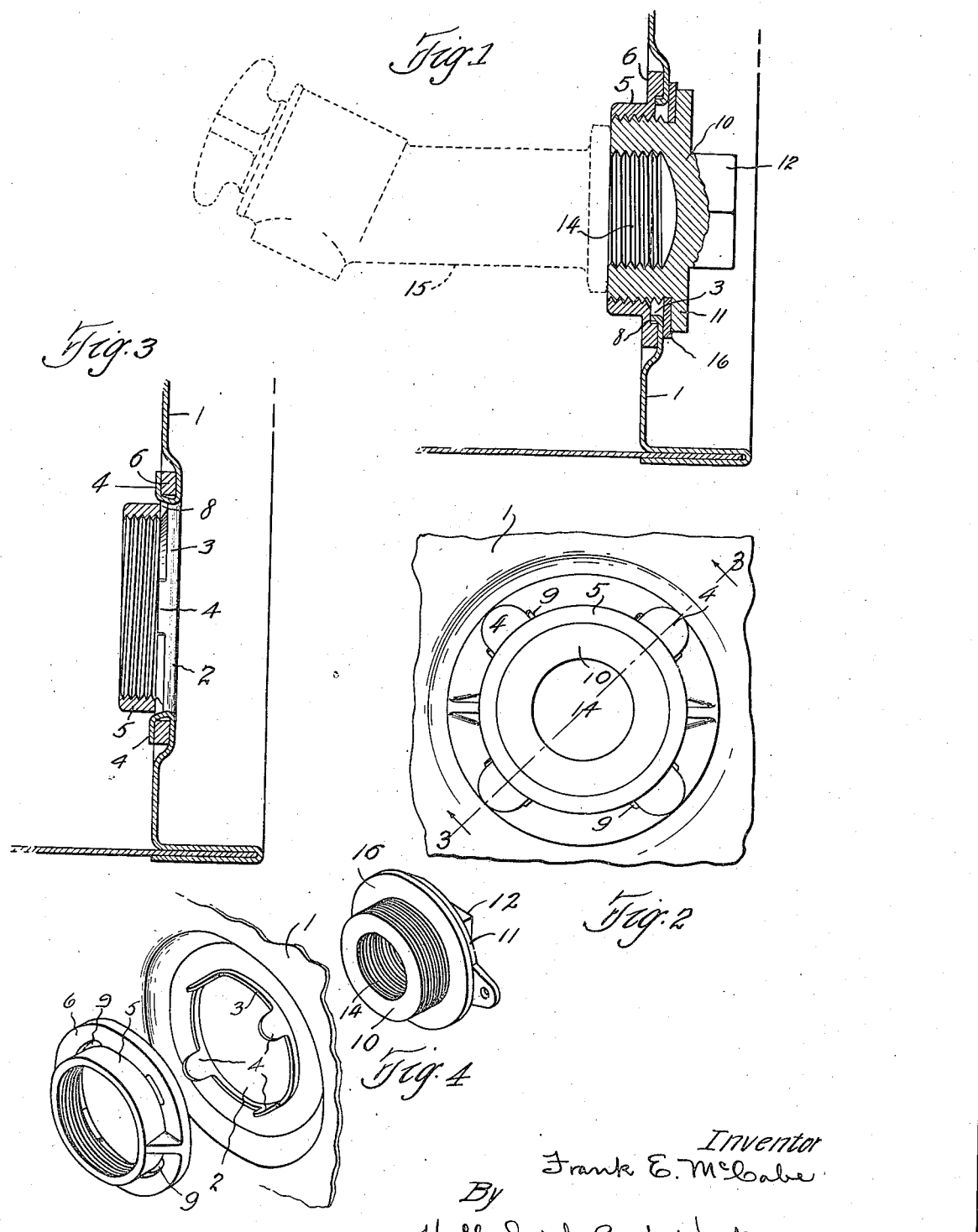

FRANK E. McCABE, OF CHAGRIN FALLS, OHIO, ASSIGNOR TO THE GRABLER MANUFACTURING COMPANY, OF CLEVELAND, OHIO, A CORPORATION OF OHIO.

BUNG BUSHING.

1,413,989.           Specification of Letters Patent.     Patented Apr. 25, 1922.

Application filed December 30, 1920. Serial No. 434,089.

*To all whom it may concern:*

Be it known that I, FRANK E. MCCABE, a citizen of the United States, residing at Chagrin Falls, in the county of Cuyahoga and State of Ohio, have invented a certain new and useful Improvement in Bung Bushings, of which the following is a full, clear, and exact description, reference being had to the accompanying drawings.

This invention relates to sheet metal barrels or containers, or to containers involving sheet metal parts to which the bung bushing is attached; and it has to do more particularly with a novel form of bushing and a unique means of attaching this bushing to the sheet metal parts.

The object of the invention is to provide a simple and economical construction through which the bung bushing may be attached quickly and in a particularly convenient manner, the same representing a material saving of time, labor and expense over the methods at present employed. By reason of the nature of the connection between the bushing and the container wall a drain is provided through which the entire contents may be removed by tilting the container so that the bung opening is at the lowest point thereof.

In the drawing accompanying and forming a part hereof and wherein similar reference characters designate corresponding parts throughout the several views, Fig. 1 is a fragmentary sectional view of a sheet metal container incorporating my improvements; Fig. 2 is an inside view of the bushing applied to the wall of the container; Fig. 3 is a section on the line 3—3 of Fig. 2, the plug being omitted; and Fig. 4 is a perspective view of the bushing, a section of the container wall, and the plug, in separated condition.

The sheet metal wall 1 of the container is provided with a bung hole 2. A shallow flange or lip 3 is directed inwardly about the hole 2 and lugs 4 extend from the inner edge of the flange or lip.

The bushing is designated 5, is cylindrical in form and is internally threaded; and at what may be termed its outer end it is provided with a flange 6. The forward end of the bushing is counterbored to form a shoulder 8, and slots 9 open through the flange 6 from the shoulder 8 adjacent the cylindrical wall of the bushing. The slots 9 correspond in number and position with the lugs 4 of the container wall.

In applying the bushing to the wall of the container it is placed down over the flange or lip 3 so that the latter enters the counterbored portion of the bushing and reposes in juxtaposition to the shoulder 8 while the lugs 4 extend through the slots 9. The lugs are then turned outwardly and pressed firmly against the flange 6 so as to hold the bushing securely against the wall of the container. This provides a very convenient and effectual connection between the container wall and the bushing. Furthermore, it does not require the use of securing means separate from the elements themselves, and avoids the need of welding, soldering or brazing the connection.

10 is a threaded plug that fits the bushing 5 and is provided with a flange 11 that is opposed to that portion of the wall 1 immediately surrounding the bung hole. The plug is formed with a suitable wrench receiving portion 12. A threaded socket 14 is formed in the inner end of the plug for the support of a faucet 15, indicated in dotted lines in Fig. 1. This is in accordance with common practice where the faucet is temporarily supported within the container from the inner side of the plug that closes the filling opening during the transportation and storage of the container; but in making the container ready for use, the filling plug is removed, the faucet disconnected therefrom, the plug returned to the bung hole and the faucet applied to a second bushing (not shown) in another part of the container. A washer 16 of rubber or other suitable material is compressed between the flange 11 of the plug and the adjacent portion of the container wall 1 to prevent leakage.

It will be noted that, in the present illustration the wall 1 is pressed outwardly about the bung opening to a depth substantially equal to the thickness of the flange 6 so that the inner surface of the flange is flush with the corresponding surface of the wall 1. Consequently, when the container is turned with the wall 1 downward and in a horizontal plane, the contents of the container may be entirely removed by allowing it to drain through the slots 9. These slots, therefore, take care of that part of the contents which falls below the level of the upper end of the bushing 5 when the container is being emptied.

Having thus described my invention, what I claim is:—

1. In a construction of the character set forth, the combination of a sheet metal wall having an opening and a plurality of lugs projecting from the edge of the opening, and a bushing applied to the wall in register with the opening, said lugs being engaged with said bushing in such manner as to secure the bushing in place.

2. In a construction of the character set forth, the combination of a sheet metal wall having an opening and a plurality of lugs projecting from the edge of the opening, and a bushing applied to the wall in register with the opening and having apertures through which said lugs are engaged and beyond which they are offset laterally thereby to secure the bushing in place.

3. In a construction of the character set forth, the combination of a sheet metal wall having an opening, a flange projecting inwardly about said opening, and a plurality of lugs extending from the flange; and a bushing adapted to receive the flange and having apertures through which said lugs are engaged and beyond which they are offset laterally, thereby to secure the bushing to the wall.

4. In a construction of the character set forth, the combination of a sheet metal wall having an opening, a flange projecting inwardly about said opening, and a plurality of lugs extending from the flange; and a bushing having a counterbored part adapted to receive the flange and apertures through which said lugs are engaged and beyond which they are offset laterally, thereby to secure the bushing to the wall.

5. In a construction of the character set forth, the combination of a sheet metal wall having an opening and a plurality of lugs projecting from the edge of the opening, and a bushing having a flange fitting against the wall, the flange being provided with slots through which the aforesaid lugs extend and beyond which they are turned laterally for holding the bushing to the wall.

6. In a construction of the character set forth, the combination of a sheet metal wall having an opening surrounded by an inwardly directed lip from the edge of which project a plurality of lugs, and a cylindrical bushing having a flange at one end arranged to fit against the wall and counterbored to receive the aforesaid lip, the diameter of the counterbore being greater than that of the bushing, the flange having slots opening into the counterbore and through which the aforesaid lugs project and beyond which they are turned laterally to hold the bushing to the wall.

7. In a construction of the character set forth, the combination of a sheet metal wall having an opening and a plurality of lugs projecting from the edge of the opening, a bushing applied to the wall in register with said opening and having apertures through which said lugs are engaged and beyond which they are offset laterally, thereby to secure the bushing in place, and a closure for closing the aforesaid opening and apertures.

8. In a construction of the character set forth, the combination of a sheet metal wall having an opening and a plurality of lugs projecting from the edge of the opening, a bushing applied to the wall in register with said opening, and having apertures through which said lugs are engaged and beyond which they are offset laterally thereby to secure the bushing in place, and a member designed for holding engagement within the bushing and arranged to close the aforesaid opening and apertures.

In testimony whereof, I hereunto affix my signature.

FRANK E. McCABE.